(No Model.)
A. W. BILLINGS.
PROCESS OF MANUFACTURING BEER OR ALE.
No. 398,374. Patented Feb. 26, 1889.
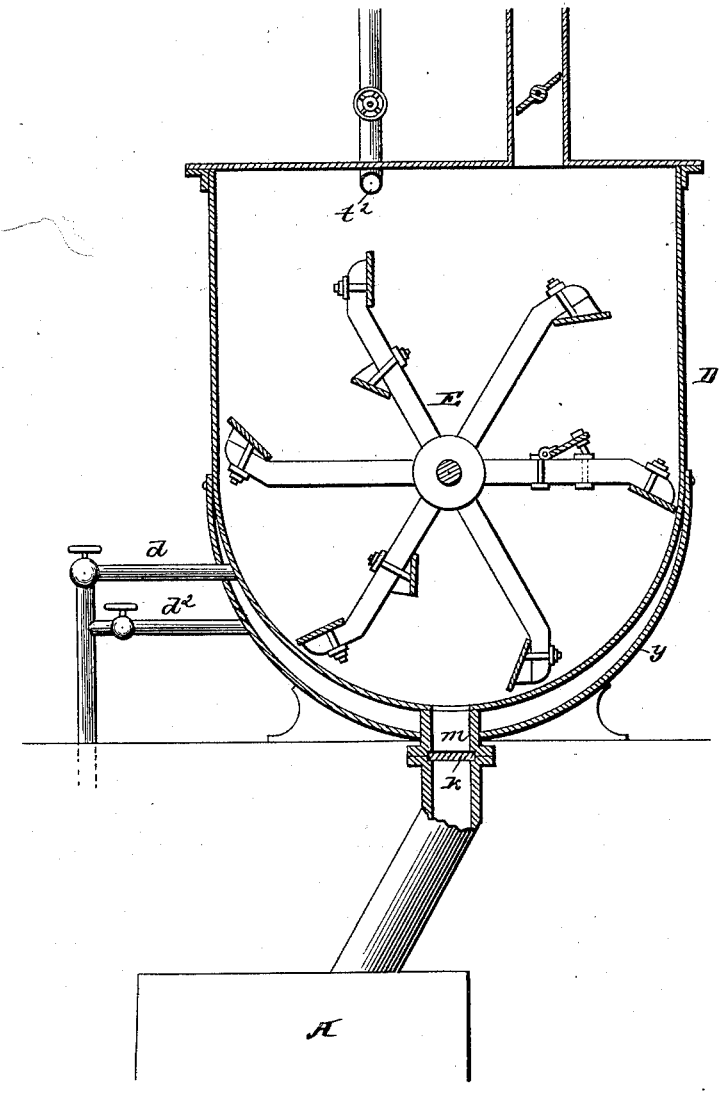

UNITED STATES PATENT OFFICE.

ANDREW W. BILLINGS, OF BROOKLYN, NEW YORK.

PROCESS OF MANUFACTURING BEER OR ALE.

SPECIFICATION forming part of Letters Patent No. 398,374, dated February 26, 1889.

Application filed February 9, 1887. Serial No. 227,057. (No specimens.)

*To all whom it may concern:*

Be it known that I, ANDREW W. BILLINGS, a citizen of the United States, and a resident of Brooklyn, Kings county, New York, have invented certain new and useful Improvements in the Process of Manufacturing Beer or Ale, of which the following is a specification.

My invention embodies certain improvements in the method of manufacturing beer or ale, as set forth in Letters Patent No. 324,522, granted to me August 18, 1885. In such process I made two mashes, one of malt of the ordinary kind, using any desired apparatus, and another, which I term the "supplemental mash," consisting of raw grain—as corn or rice—heated to about 210°, so as to develop the starch-cells without cooking them or extracting the oily portions of the grain, and a comparatively small proportion of malt introduced therein, as set out in detail in said patent.

In the practical application of the above-referred-to patented method of manufacturing beer I have in some instances been unable to obtain a complete conversion of the starch contained in the raw grain (corn) and malt of the supplemental mash, for the reason that the malt used contained less diastase or starch-converting albuminoids than is ordinarily present in malt employed for brewing purposes. The lack of starch-converting albuminoids is especially noticeable in the so-called "pale malt," which, on account of the present demand for light-colored beers, is coming into increased use. In using a malt poor in diastase a very large percentage of the malt required for the malt mash would have to be added to the malt and raw grain in the supplemental mash in order to thoroughly convert the starch contained in the raw grain. Such an addition would leave an insufficient quantity of malt in the malt mash to act as a filtering medium, and the resulting wort would be turbid and not drain properly from the grains (exhausted malt and raw grain) remaining in the mash-tub. This would occasion not only a great loss in extractive matter and consequent reduction in the number of barrels of wort produced, but also a turbid, ropy beer, difficult to clarify and liable to spoil.

Incomplete conversion of the starch in the supplemental mash leads to innumerable losses and difficulties, principal among which are the following: The percentage of extractive matter in the wort is reduced, producing thereby a lesser number of barrels than if complete conversion had taken place. A large percentage of the unconverted starch dissolves in the wort of the supplemental mash, and, if it escapes conversion in the malt mash, (which it generally does,) passes through the after stages of boiling, cooling, fermentation, and clarification without separating, thereby not only rendering the finished beer turbid, but also imparting a peculiar musty flavor, which makes the beer unsalable.

The object of this invention is to remedy the difficulties above enumerated by completely converting the starch contained in the raw grain or other starchy material used in the supplemental mash, even when operating with a quality of malt of low converting power; and I accomplish this by properly regulating the temperature of the supplemental mash so as not to destroy the diastase contained therein, and then discharge the supplemental mash into the main or malt mash at such a time when the temperature of the latter indicates that its starch-converting albuminoids are exerting their fullest power. By operating in this manner the unconverted starch in the supplemental mash is entirely converted, and the resulting wort is not only bright and clear, but produces a bright and finely-flavored beer. The relative proportions of the two mashes may be varied somewhat as the quality of the malt, whether rich or poor in diastase, the kind of beer or ale to be manufactured, &c., may require, ordinarily the proportions being two or three parts of the malt mash to one of the supplemental mash, though I do not wish to be limited to these proportions.

In carrying out my process I use an apparatus substantially of the character represented in the accompanying drawing, which shows the same in cross-sectional elevation. Said apparatus consists of a tank, D, having a steam-jacket, $y$, at the bottom, with steam-pipes $d\,d^2$, admitting steam into the tank and into the jacket, and a discharge-pipe, $m$, having a valve, $k$, permitting the supplemental mash to pass to the usual mash-tub, A, below. A pipe, $t^2$, serves to introduce water or other fluid to the tank, and a revolving frame carrying stirrer-blades is so constructed and operated as to rapidly mingle the particles and prevent one portion of the mass from rising to a higher temperature than another, thereby securing a simultaneous conversion of all the particles.

The supplemental mash containing raw grain, corn, starch, or other starchy material, together with the proper quantity of malt and water, as described in Letters Patent No. 324,522, is heated in the tank D either by the injection of live steam directly or indirectly by means of a steam-jacket or a coil to a temperature not exceeding 170° Fahrenheit, or a temperature above which the diastase would be destroyed. The supplemental mash is run into the main or malt-mash tub A when the mash in the latter has acquired a temperature at which its diastase or starch-converting albuminoids are most active. This temperature, depending on the malt used, will vary from 140° to 170° Fahrenheit. The two mashes, having been thoroughly mixed, are allowed to stand from one-half an hour to an hour, and the subsequent operations carried out as in ordinary brewing.

The starting of the supplemental mash can be so regulated that it will have reached its final temperature by the time that the malt mash has attained the most favorable temperature for conversion.

Depending upon the malt used and the method of brewing, the temperature of the supplemental mash at the time it is mixed with the malt mash can be varied to suit the conditions, but should not be less than 140° Fahrenheit nor attain a temperature at which the diastase is destroyed.

Without limiting myself to the construction and use of the apparatus shown, I claim—

1. The within-described improvement in the manufacture of beer, consisting in making a malt mash and also making a supplemental mash by mixing together malt and raw grain with water, raising the temperature not to exceed the coagulating point of diastase, and then mixing the supplemental mash with the main mash at a temperature varying between 140° and 170° Fahrenheit, and then conducting operations as in ordinary brewing, substantially as described.

2. In the manufacture of beer or ale, making a malt mash and making a supplemental mash by mixing together malt and corn with water, gradually raising the temperature by the injection of live steam to a point at which the diastase remains active, and then mixing the supplemental mash with the malt mash when at a temperature most suitable to conversion, and then treating as usual in the manufacture of ale or beer, substantially as described.

In testimony whereof I have signed my name to this specification in the presence of two subscribing witnesses.

ANDREW W. BILLINGS.

Witnesses:
E. LOUIS LOWE,
HENRY MAJOR.